(12) United States Patent
Longoria et al.

(10) Patent No.: US 11,725,743 B2
(45) Date of Patent: Aug. 15, 2023

(54) BALANCED PLUG ASSEMBLIES AND PRESSURE REGULATORS HAVING BALANCED PLUG ASSEMBLIES

(71) Applicant: Emerson Process Management Regulator Technologies, Inc., McKinney, TX (US)

(72) Inventors: Ruben Longoria, Little Elm, TX (US); Tony Durant, McKinney, TX (US); Andrew Da Costa, McKinney, TX (US); David Plummer, Irving, TX (US)

(73) Assignee: EMERSON PROCESS MANAGEMENT REGULATOR TECHNOLOGIES, McKinney, TX (US)

( * ) Notice: Subject to any disclaimer, the term of this patent is extended or adjusted under 35 U.S.C. 154(b) by 67 days.

(21) Appl. No.: 17/459,142

(22) Filed: Aug. 27, 2021

(65) Prior Publication Data

US 2023/0068490 A1 Mar. 2, 2023

(51) Int. Cl.
*F16K 17/22* (2006.01)
*F16K 1/36* (2006.01)
*F16K 31/126* (2006.01)

(52) U.S. Cl.
CPC .............. *F16K 17/22* (2013.01); *F16K 1/36* (2013.01); *F16K 31/1262* (2013.01)

(58) Field of Classification Search
CPC ........ F16K 31/1262; F16K 17/22; F16K 1/36; G05D 16/02; G05D 16/106; G05D 16/0688
See application file for complete search history.

(56) References Cited

U.S. PATENT DOCUMENTS

| 4,754,778 A | * | 7/1988 | Duffy | G05D 16/02 137/505.46 |
|---|---|---|---|---|
| 10,168,717 B2 | | 1/2019 | Lin et al. | |
| 2010/0071786 A1 | * | 3/2010 | Hawkins | F16K 17/32 137/485 |

(Continued)

OTHER PUBLICATIONS

International Searching Authority, "International Search Report and Written Opinion," issued in connection with International Patent Application No. PCT/US2022/035144, dated Oct. 11, 2022 (13 pages).

*Primary Examiner* — Jessica Cahill
(74) *Attorney, Agent, or Firm* — Hanley, Flight & Zimmerman, LLC

(57) ABSTRACT

Balanced plug assemblies and pressure regulators having balanced plug assemblies are described herein. A pressure regulator disclosed herein includes a device body defining a fluid passageway between an inlet and an outlet. The device body defines a channel between the fluid passageway and a pressure sense chamber. The pressure regulator includes a seat in the fluid passageway, a stem having a flange, and a plug coupled to the stem. The pressure regulator also includes a stem guide disposed in the channel of the device body. The flange of the stem disposed in a balance chamber of the stem guide and divides the balance chamber into a first balance chamber portion and a second balance chamber portion. The stem guide at least partially forms a balance passage that fluidly couples the pressure sense chamber and the second balance chamber portion.

20 Claims, 6 Drawing Sheets

(56) References Cited

U.S. PATENT DOCUMENTS

| | | | |
|---|---|---|---|
| 2013/0228240 A1* | 9/2013 | Noceti | G05D 16/0666 137/505.39 |
| 2013/0255791 A1* | 10/2013 | Nashery | G05D 16/0608 137/12 |
| 2014/0083530 A1* | 3/2014 | Fan | G05D 16/02 137/505.41 |
| 2015/0234395 A1 | 8/2015 | Fan et al. | |
| 2018/0046204 A1 | 2/2018 | Lin et al. | |

* cited by examiner

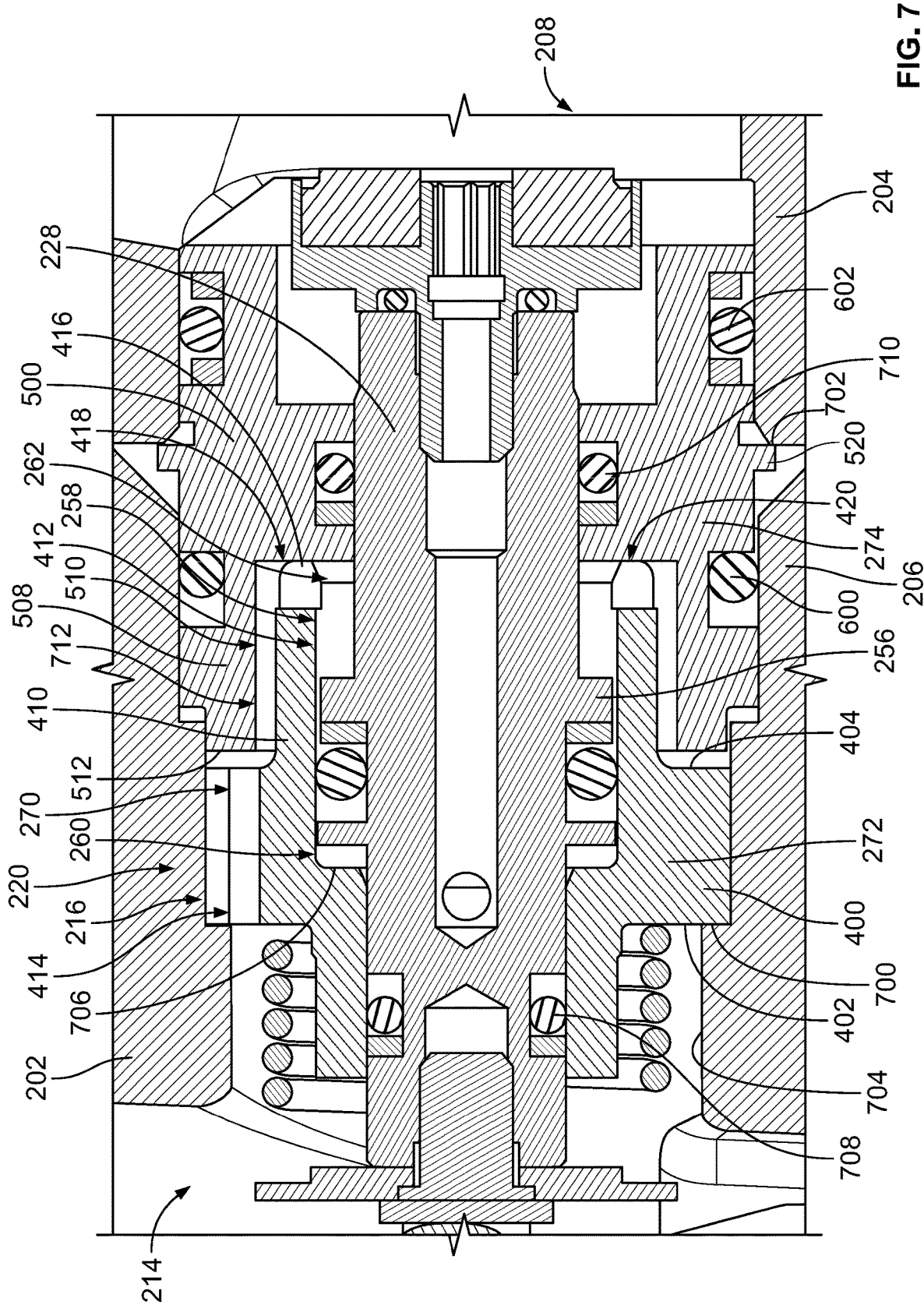

BALANCED PLUG ASSEMBLIES AND PRESSURE REGULATORS HAVING BALANCED PLUG ASSEMBLIES

FIELD OF THE DISCLOSURE

This disclosure relates generally to process control devices and, more particularly, to balanced plug assemblies and pressure regulators having balanced plug assemblies.

BACKGROUND

Pressure regulators, sometimes referred to as fluid regulators, are commonly distributed throughout process control systems to control flow rates and/or pressures of various fluids (e.g., liquids, gases, etc.). Pressure regulators can be used to regulate the pressure of a fluid to a substantially constant value. For example, a pressure regulator typically has an inlet that receives a supply of process fluid at a relatively high pressure and reduces the pressure to a relatively lower and/or substantially constant pressure at an outlet.

SUMMARY

A pressure regulator disclosed herein includes a device body defining a fluid passageway between an inlet and an outlet. The device body defines a channel between the fluid passageway and a pressure sense chamber. The pressure regulator includes a seat in the fluid passageway, a stem having a flange, and a plug coupled to the stem. The stem is moveable to move the plug relative to the seat to control a flow of fluid between the inlet and the outlet. The pressure regulator also includes a stem guide disposed in the channel of the device body. The stem guide has a first side exposed to the fluid passageway and a second side exposed to the pressure sense chamber. The stem guide defines a balance chamber. The stem extends through the stem guide. The flange of the stem disposed in the balance chamber and divides the balance chamber into a first balance chamber portion and a second balance chamber portion. The stem guide at least partially forms a balance passage that fluidly couples the pressure sense chamber and the second balance chamber portion.

A plug assembly for a pressure regulator disclosed herein includes a stem having a stem body and a flange extending radially from the stem body, a plug coupled to the stem body, the plug to be moved relative to a seat in the pressure regulator to control a flow of fluid through the seat, and a stem guide to be disposed in the pressure regulator between a fluid passageway and a pressure sense chamber. The stem guide has a first side to face the pressure sense chamber and a second side to face the fluid passageway. The stem guide defines a balance chamber. The stem extends through the stem guide such that the flange is disposed in the balance chamber. The flange divides the balance chamber into a first balance chamber portion and a second balance chamber portion. A first balance passage is defined in the stem and the plug that fluidly couples the fluid passageway and the first balance chamber portion. A second balance passage is defined in the stem guide that fluidly couples the pressure sense chamber and the second balance chamber portion.

A pressure regulator disclosed herein includes a device body defining a fluid passageway between an inlet and an outlet. The device body has a bore between the fluid passageway and a pressure sense chamber. The pressure regulator includes a seat in the fluid passageway, a stem having a flange, and a plug coupled to the stem. The stem is moveable to move the plug relative to the seat to control a flow of fluid between the inlet and the outlet. The pressure regulator also includes a stem guide disposed in the bore of the device body. The stem guide has a first side exposed to the fluid passageway and a second side exposed to the pressure sense chamber. The stem guide defines a balance chamber. The stem extends through the stem guide. The flange of the stem is disposed in the chamber and divides the chamber into a first balance chamber portion and a second balance chamber portion. The pressure regulator further includes means for fluidly coupling the fluid passageway and the first balance chamber portion, and means for fluidly coupling the pressure sense chamber and the second balance chamber portion.

BRIEF DESCRIPTION OF THE DRAWINGS

FIG. 2 shows the example pressure regulator in an open position or state.

FIG. 7 is an enlarged cross-sectional view of the plug assembly in the example pressure regulator of FIG. 2.

Figure 1:
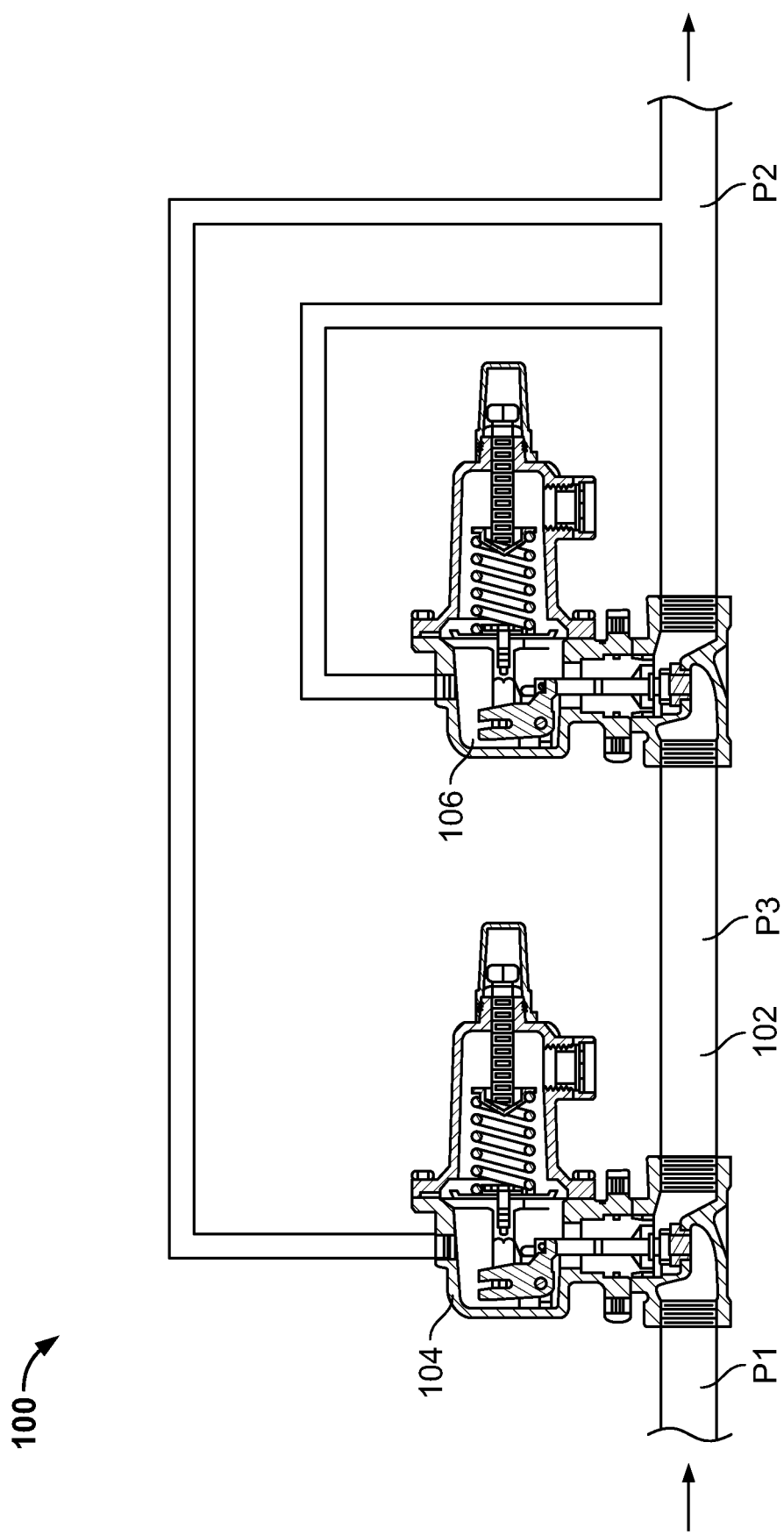
FIG. 1 is a schematic of an example pressure regulator system including a configuration of two pressure regulators that may be implemented by the example pressure regulators disclosed herein.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

In general, pressure regulators (sometimes referred to as fluid regulators) modulate the flow of fluid in accordance with a sensed downstream pressure to maintain process system pressures within acceptable and/or constant pressure limits. Pressure regulators typically include a plug assembly having a plug coupled to a stem. The stem is moveable to move the plug relative to a seat to control the flow of fluid through a fluid passageway between an inlet and an outlet of the pressure regulator. Pressure regulators also include a diaphragm operatively coupled to the stem. The diaphragm separates a pressure sense chamber from a control chamber. The pressure sense chamber is fluidly coupled to and receives fluid from a downstream point. The stem is disposed between the pressure sense chamber and the fluid passageway. The diaphragm moves in response to a difference in force between a force exerted by the pressure of the fluid in the pressure sense chamber (from the sensed downstream point) and the control chamber (e.g., set via a spring). Movement of the diaphragm causes the plug to move away from or toward the seat to allow or restrict the flow of fluid through the fluid passageway and, thus, between the inlet and the outlet of the pressure regulator.

In some examples, the pressure sense chamber is fluidly coupled to the outlet of the pressure regulator. This is often referred to as an internal sense pressure regulator. However, in other configurations, the pressure sense chamber is fluidly coupled to a downstream pressure point. Therefore, the pressure regulator modulates the pressure or flow of fluid based on a further downstream pressure. This is often referred to as an external sense pressure regulator.

Some pressure regulators include a balanced plug assembly. In particular, the stem may have a flange disposed in a chamber defined by a stem guide body. The plug assembly includes a balance port that fluidly couples the fluid in the fluid passageway and the chamber. This helps reduce or eliminate a pressure differential across the stem to reduce the influence of the inlet pressure on the stem and plug. However, in some situations, such as when the pressure regulator is in an open state for a period of time, the outlet area of the fluid passageway is flooded with fluid at the same pressure as the inlet of the fluid passageway. Because the pressure sense chamber may be fluidly coupled to a downstream pressure point, a pressure differential is formed across the stem. Therefore, the plug assembly is sensitive to the pressure of the inlet fluid. This can cause a delay in closing the pressure regulator because the pressure in the pressure sense chamber needs to build up additional pressure to overcome the pressure differential across the stem.

Disclosed herein are example balanced plug assemblies and example pressure regulators with example balanced plug assemblies that address the drawbacks noted above. Example balanced plug assemblies and example pressure regulators disclosed herein include a stem guide having a balance chamber, a stem, and a plug coupled to the stem. The stem has a flange. The stem extends through the stem guide such that the flange is disposed in the balance chamber. The flange divides the balance chamber into a first balance chamber portion and a second balance chamber portion. The plug assembly is disposed between a fluid passageway and a pressure sense chamber. The example pressure regulator includes a first balance passage that fluidly couples the fluid passageway and the first balance chamber portion. The example pressure regulator also includes a second balance passage that fluidly couples the pressure sense chamber and the second balance chamber portion. As such, the stem is substantially balanced with pressure in the fluid passageway and with pressure in the pressure sense chamber. This reduces or eliminates the influence of the pressure at the inlet of the pressure regulator so that the pressure regulator can remain sensitive and responsive to the pressure in the pressure sense chamber.

FIG. 1 is a schematic of an example pressure regulator system 100. The example pressure regulator system 100 can be used to regulate and/or otherwise control the flow and/or pressure of a process fluid. The process fluid can be any type of fluid, such as natural gas, oil, water, etc. FIG. 1 shows a section of an example fluid line 102 (e.g., a pipeline). The fluid line 102 supplies process fluid from an upstream source (e.g., a distribution facility) to a downstream location (e.g., a customer). In the illustrated example, the pressure regulator system 100 includes a first pressure regulator 104 and a second pressure regulator 106 that are coupled to the fluid line 102. The first and second pressure regulators 104, 106 are used to reduce the pressure of the fluid from an upstream pressure P1 to a downstream pressure P2. The downstream pressure P2 may be based on the downstream location capacity. Assume, for example, P1 is 500 pounds-per-square inch (psi). It may be desired to reduce the pressure down to 50 psi at P2.

In the illustrated example, the first and second pressure regulators 104, 106 are arranged in a specific configuration to provide over-pressurization protection. In particular, the dual or redundant pressure regulators provide a safety if one of the pressure regulators fails. The first and second pressure regulators 104, 106 are external sense pressure regulators that are tapped to the same downstream location. Thus, both pressure regulators 104, 106 are modulated based on the same downstream pressure P2. Assume for example it is desired to regulate the pressure P1 of 500 psi down to a pressure P2 of 50 psi. The first pressure regulator 104 can be set to 60 psi, and the second pressure regulator 106 can be set to 50 psi. Because the second pressure regulator 106 reduces the pressure to 50 psi, the first pressure regulator 104 senses the pressure P2 at 50 psi and, thus, remains in an open position. In some examples, the first pressure regulator 104 is referred to as a monitor, and the second pressure regulator 106 is referred to as a worker. In some instances, there is a small pressure drop across the first pressure regulator 104 even in its normal wide-open state. Therefore, the pressure at the inlet of the first pressure regulator 104 may be P1, but the pressure at the outlet of the first pressure regulator 104 may be P3 (e.g., 10 psi less than P1). The second pressure regulator 106 reduces the pressure down to the desired pressure at P2.

If the first pressure regulator 104 fails open, the second pressure regulator 106 continues to regulate the pressure as normal, thereby preventing over-pressurization at the downstream location. However, if the second pressure regulator 106 fails open, the first pressure regulator 104 senses the increased pressure at P2 and activates to reduce the pressure down to its pressure set point (i.e., 60 psi to continue the above example), thereby preventing over-pressurization at the downstream location. Therefore, in this configuration, the first pressure regulator 104 is typically held in a wide-open position, and the second pressure regulator 106 operates to reduce the pressure from P1 (or P3) down to the desired pressure P2.

Figure 2:
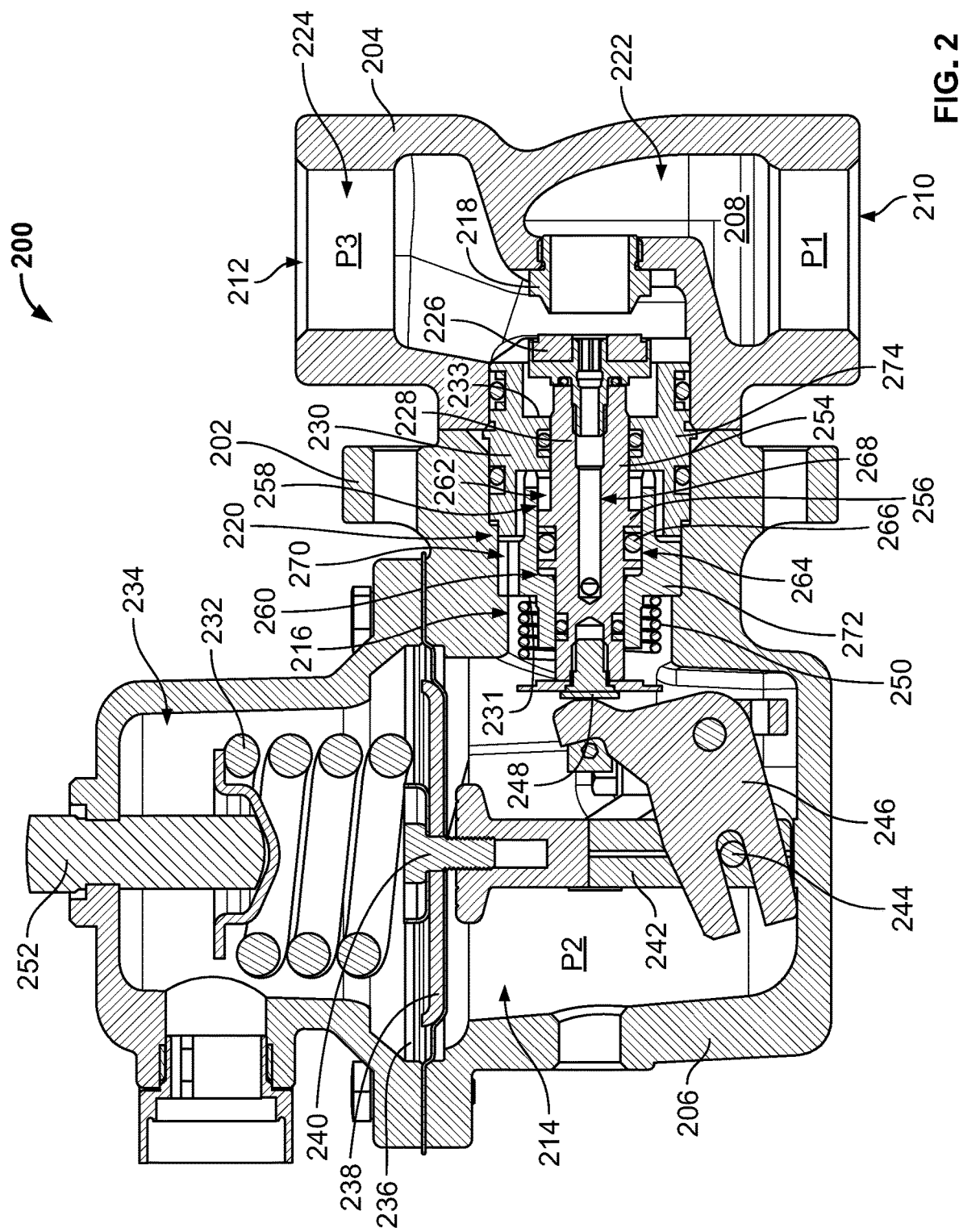
FIG. 2 is a cross-sectional view of an example pressure regulator including an example plug assembly constructed in accordance with the teachings of this disclosure.

FIG. 2 is a cross-sectional view of an example pressure regulator 200 constructed in accordance with the teachings of this disclosure. The first and/or second pressure regulators 104, 106 of FIG. 1 can be implemented as the example pressure regulator 200. In some examples, it is advantageous for the first pressure regulator 104 (the monitor) to be implemented as the pressure regulator 200, because the pressure regulator 200 provides a balanced plug assembly that is more responsive to changes in P2 pressure if the second pressure regulator 106 fails.

In the illustrated example, the pressure regulator 200 includes a device body 202 (e.g., a casing, a housing, etc.). In this example, the device body 202 includes a regulator body 204 (sometimes referred to as a valve body or housing) and a casing 206 that are coupled together (e.g., via one or more bolts). However, in other examples, the device body 202 can include more or fewer bodies or housings. In the illustrated example, the regulator body 204 of the device body 202 defines a fluid passageway 208 between an inlet 210 and an outlet 212. An upstream pipe can be coupled to the regulator body 204 at the inlet 210 to provide fluid to the fluid passageway 208. A downstream pipe can be coupled to the regulator body 204 at the outlet 212 to provide reduced pressure fluid to a downstream location. In the illustrated example, the casing 206 defines a pressure sense chamber 214. The device body 202 defines a channel 216 (e.g., an opening, a bore, etc.) between the fluid passageway 208 and the pressure sense chamber 214.

In the illustrated example, the pressure regulator 200 includes a seat 218 in the fluid passageway 208. The pressure regulator 200 also includes an example plug assembly 220. The plug assembly 220 controls the flow of fluid through the seat 218 and, thus, between the inlet 210 and the outlet 212. The seat 218 divides the fluid passageway 208 into an upstream portion 222 (upstream of the seat 218) and a downstream portion 224 (downstream of the seat 218).

Figure 3:
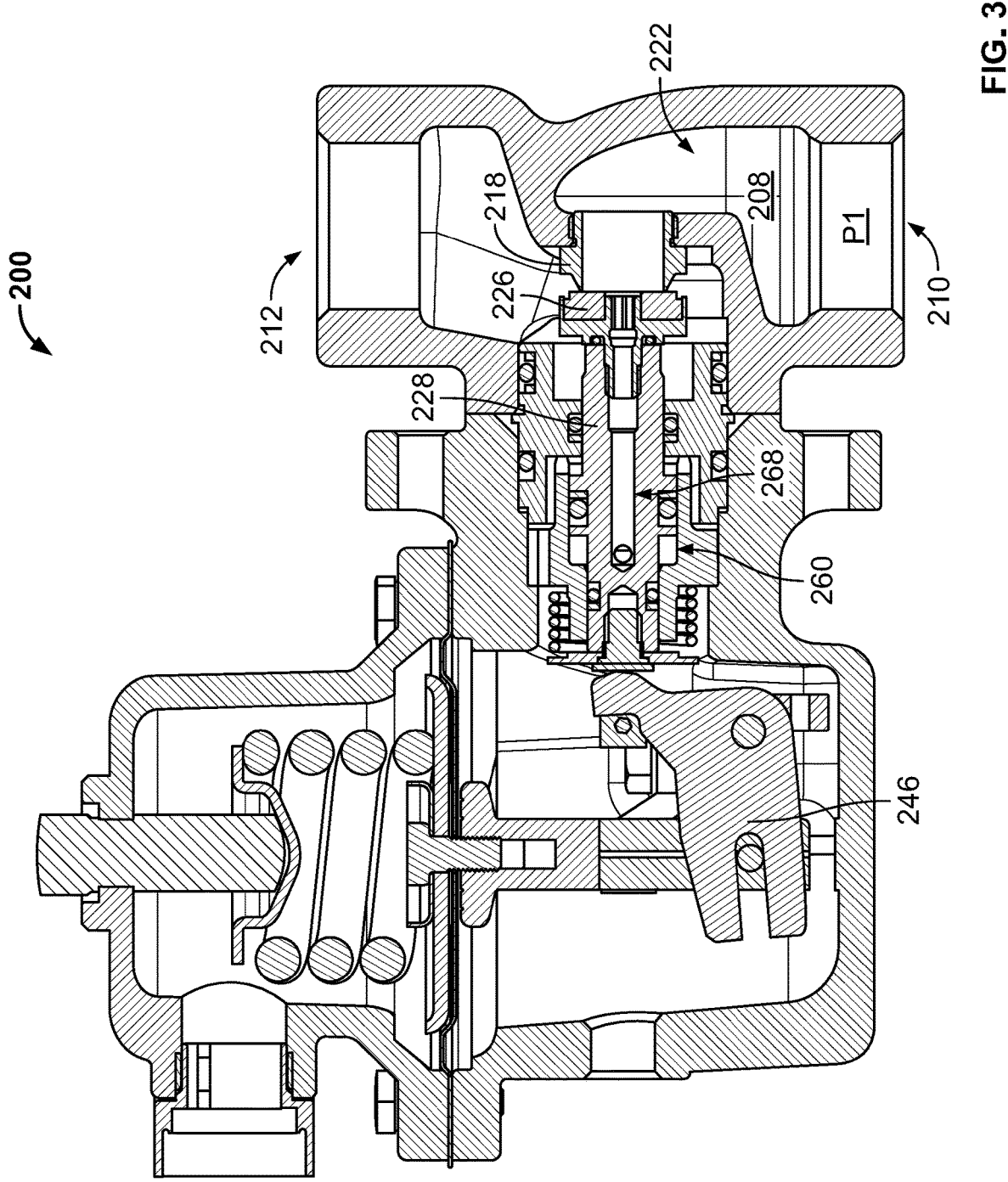
FIG. 3 shows the example pressure regulator of FIG. 2 in a closed position or state.

In the illustrated example, the plug assembly 220 includes a plug 226 (sometimes referred to as a disc or flow control member), a stem 228, and a stem guide 230. The plug 226 is coupled to the stem 228. The stem 228 is moveable (e.g., slidable) in the stem guide 230 to move the plug 226 toward or away from the seat 218, thereby controlling the flow of fluid through the seat 218. The plug 226 can be moved between an open position as shown in FIG. 2 and a closed position as shown in FIG. 3. In the open position, as shown in FIG. 2, the plug 226 is spaced from the seat 218, which allows fluid to flow from the inlet 210 to the outlet 212. In the closed position, as shown in FIG. 3, the plug 226 is sealingly engaged with the seat 218, which prevents fluid flow from the inlet 210 to the outlet 212. Therefore, the seat 218 and the plug 226 form a valve. The pressure regulator 200 is configured to move the plug 226 between the opened and closed positions to regulate the pressure of the fluid downstream.

Referring to FIG. 2, the stem guide 230 is disposed in the channel 216 between the pressure sense chamber 214 and the fluid passageway 208. The stem guide 230 is sealed relative to the device body 202 to fluidly isolate the fluid in the fluid passageway 208 and fluid in the pressure sense chamber 214. The stem guide 230 has a first side 231 and a second side 233 opposite the first side 231. The first side 231 faces the pressure sense chamber 214 and is exposed to the pressure sense chamber 214. The second side 233 faces the fluid passageway 208 and is exposed to the fluid passageway 208.

As shown in FIG. 2, the casing 206 includes a control spring 232. The control spring 232 is used to control or set the pressure at which the pressure regulator 200 opens and closes. The control spring 232 is disposed in a control chamber 234 in the casing 206. In some examples, the control chamber 234 is open to the atmosphere. In other examples, the control chamber 234 may be pressurized with a fluid. In the illustrated example, the pressure regulator 200 includes a diaphragm 236 that separates the control chamber 234 and the pressure sense chamber 214. The pressure regulator 200 includes a diaphragm plate 238 that is coupled to the diaphragm 236 via a diaphragm cap screw 240. The control spring 232 is engaged with the diaphragm plate 238, which biases the diaphragm plate 238 and the diaphragm 236 toward the pressure sense chamber 214 (downward in FIG. 2). The diaphragm plate 238 is coupled to a pusher post 242 (e.g., via the diaphragm cap screw 240). The pusher post 242 includes a drive pin 244 that cooperates with a lever 246. The lever 246 is pivotably coupled to the casing 206. The lever 246 is coupled to a stem pin 248 that is coupled to the stem 228. As the pusher post 242 moves up and down, the pusher post 242 rotates the lever 246, which moves the stem 228 linearly in the stem guide 230 (left and right in FIG. 2).

The pressure regulator 200 receives fluid at the inlet 210 at a pressure P1. The pressure regulator 200 is configured to stop or reduce the flow of fluid to the outlet 212 based on pressure of fluid at a downstream point, referred to as P2. If the pressure P2 meets or exceeds a certain pressure (which may be referred to herein as a set or trigger pressure), the pressure regulator 200 closes the fluid passageway 208, thereby regulating the pressure of the fluid at the downstream point. In the illustrated example, the downstream point is fluidly coupled to the pressure sense chamber 214. Therefore, the pressure sense chamber 214 is at the pressure P2. In this example, the pressure regulator 200 is an external sense pressure regulator, meaning the pressure sense chamber 214 is referenced to an external pressure. The pressure of the downstream point is fluidly coupled to the pressure sense chamber 214 via a fluid line (e.g., a hose, a pipe, a tube, etc.). In other examples, the pressure regulator 200 could be an internal sense pressure regulator, meaning the pressure sense chamber 214 is referenced to the pressure of the fluid in the downstream portion 224. In such an example, the pressure regulator 200 can include one or more passages to fluidly couple the downstream portion 224 of the fluid passageway 208 and the pressure sense chamber 214.

When the pressure P2 in the pressure sense chamber 214 reaches the set pressure, the pressure P2 overcomes the force of the control spring 232 and forces the diaphragm 236 upward in FIG. 2. As the diaphragm 236 and the diaphragm plate 238 move upward, the pusher post 242 rotates the lever 246 clockwise in FIG. 2. The lever 246 pushes the stem 228 to the right in FIG. 2, until the plug 226 engages the seat 218 to close off the fluid passageway 208, as shown in the position in FIG. 3. This reduces the pressure of the fluid at the downstream point. When the pressure P2 of the fluid in the pressure sense chamber 214 drops below the set pressure, the spring force overcomes the pressure and moves the diaphragm 236 and the diaphragm plate 238 downward. The pusher post 242 moves downward and rotates the lever 246 in the opposite direction. In some examples, the pressure regulator 200 includes a return spring 250 to bias the stem 228 back to the left in FIG. 2, such that the plug 226 moves away from the seat 218. Therefore, the set pressure is based (at least partially) on the spring force from the control spring 232. In some examples, the spring force can be increased or decreased to change the set pressure to a desired pressure level. For example, an adjustment screw 252 can be adjusted to increase or decrease the compression of the control spring 232 and, thus, change the force the control spring 232 exerts on the diaphragm 236.

In the illustrated example, the pressure of the fluid in the downstream portion 224 of the fluid passageway 208 is at pressure P3. In some examples, such as when the plug 226 is throttling (e.g., actively moving between the open and closed positions), the pressure P3 may be substantially lower than the pressure P1. In other examples, such as when the plug 226 is held in the open position for a period of time, the pressure P3 may be the same or substantially the same as the pressure P1 (e.g., there may be a small pressure drop across the seat 218). In some examples, the pressure P2 is the same as the pressure P3. However, in other examples, the pressure P2 can be different than the pressure P3. For example, the pressure P2 may be referenced to a point that is downstream of another pressure regulator, such as in the configuration shown in FIG. 1.

Because the pressures P1, P2, and P3 may be different, the example pressure regulator 200 balances the stem 228 to reduce or eliminate the influence of the pressure differential on the stem 228 and the plug 226. In the illustrated example, the stem 228 has a stem body 254 and a flange 256 extending radially from the stem body 254. The stem guide 230 defines a balance chamber 258. The stem 228 extends through the stem guide 230, such that the flange 256 is disposed in the balance chamber 258. The flange 256 divides the balance chamber 258 into a first balance chamber portion 260 and a second balance chamber portion 262. The flange 256 fluidly separates the first and second balance chamber portions 260, 262. In the illustrated example, the flange 256 has a seal gland 264. The pressure regulator 200 includes a seal 266 in the seal gland 264 and engaged with an inner surface of the stem guide 230 forming the balance chamber 258. As such, the seal 266 fluidly isolates the first and second balance chamber portions 260, 262.

In the illustrated example, a first balance passage 268 (which may also be referred to as a first balance port) is defined through the plug 226 and the stem 228 that extends to the first balance chamber portion 260. In particular, a portion of the first balance passage 268 extends longitudinally through the stem 228, and another portion of the first balance passage 268 extends in a transverse direction (e.g., into or out of the page in FIG. 2) to the outer surface of the stem 228. As such, when the plug 226 is in the open position, as shown in FIG. 2, the first balance passage 268 fluidly couples the downstream portion 224 of the fluid passageway 208 and the first balance chamber portion 260. Therefore, the fluid in the first balance chamber portion 260 is at P3 (which may be the same as or similar to P1). When the plug 226 is in the closed position, as shown in FIG. 3, the first balance passage 268 fluidly couples the upstream portion 222 of the fluid passageway 208 and the first balance chamber portion 260. Therefore, the fluid in the first balance chamber portion 260 is at P1. Therefore, in this example, the first balance passage 268 forms means for fluidly coupling the fluid passageway 208 and the first balance chamber portion 260. In other examples, the first balance passage 268 could be formed by one or more openings or channels through one or more other structures.

In some instances, P2 may be the same as or close to P3. However, in other instances, such as where the pressure regulator 200 is used as a monitor and the plug 226 is in the open position for an extended period of time, P3 may be closer to or the same as P1, and may be significantly different than P2. Therefore, if the plug assembly 220 is only balanced based on P1 or P3, there may be a pressure difference across the stem 228 between the P1/P3 pressure on the right side, and the P2 pressure on the left side. As such, the pressure sense chamber 214 may need to build additional pressure to overcome the pressure differential and move the plug 226 to the closed position. This buildup is undesirable because it causes a delay in closing the pressure regulator 200 and, thus, overpressure protection is not being provided.

To overcome this drawback, the plug assembly 220 is also pressure balanced based on the pressure P2 in the pressure sense chamber 214. In particular, the second balance chamber portion 262 is pressure balanced with the pressure sense chamber 214. The second balance chamber portion 262 is fluidly coupled with the pressure sense chamber 214. Therefore, the pressure of the fluid in the second balance chamber portion 262 is the same or substantially the same as P2 in the pressure sense chamber 214. This helps balance the pressure difference across the stem 228.

To balance the second balance chamber portion 262 and the pressure sense chamber 214, the pressure regulator 200 includes a second balance passage 270 (which may also be referred to as a second balance port). In the illustrated example, the stem guide 230 at least partially forms the second balance passage 270. The second balance passage 270 fluidly couples the pressure sense chamber 214 and the second balance chamber portion 262, but is fluidly isolated from the first balance chamber portion 260. As a result, the stem 228 is balanced with pressure P2 in the pressure sense chamber 214 and the second balance chamber portion 262, and is also balanced with pressure P1 or P3 (depending on whether the plug 226 is open or closed) in the fluid passageway 208 and the first balance chamber portion 260. This allows the pressure regulator 200 to be more responsive to changes in P2, and less sensitive to the pressures P1 and P3 in the fluid passageway 208. Therefore, if a change in P2 occurs, the plug assembly 220 can react and open or close the plug 226 more quickly.

In the illustrated example, the stem guide 230 is formed by two stem guide bodies. In particular, the stem guide 230 shown in FIG. 2 includes a first stem guide body 272 and a second stem guide body 274. In some examples, the first and second stem guide bodies 272, 274 are coupled together (e.g., via one or more fasteners, via friction fit, etc.). In other examples, the first and second stem guide bodies 272, 274 are not physically coupled, but merely disposed relative to each other in the channel 216. The second balance passage 270 is defined in the stem guide 230. In particular, the second balance passage 270 is formed by one or more channels through the first and/or second stem guide bodies 272, 274. In some examples, at least a portion of the second balance passage 270 is formed by a space or gap between the first and second stem guide bodies 272, 274.

Figure 4A:
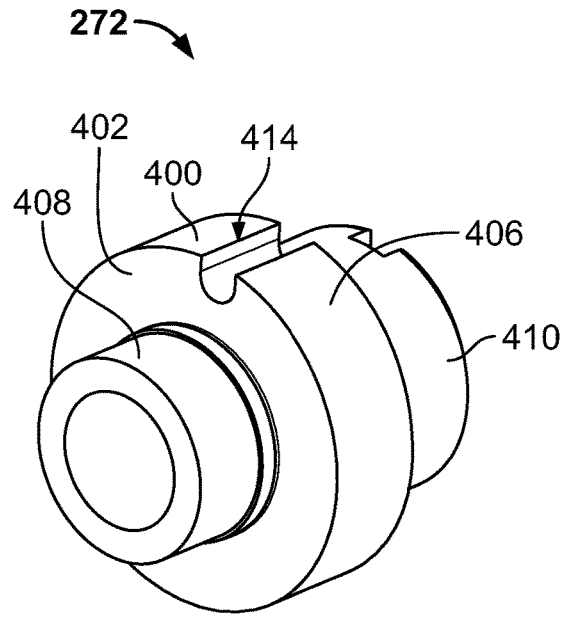
FIGS. 4A and 4B are perspective views of an example first stem guide body of the example plug assembly of FIG. 2.
Figure 4B:
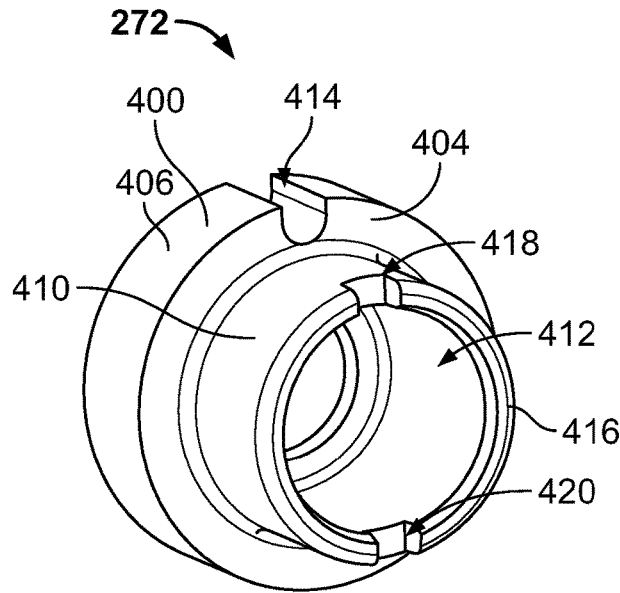

FIGS. 4A and 4B are perspective views of the first stem guide body 272. The first stem guide body 272 has a first disc 400 having a first side 402, a second side 404 opposite the first side 402, and an outer peripheral edge 406. The first stem guide body 272 has a spring guide 408 extending from the first side 402 of the first disc 400. When the plug assembly 220 (FIG. 2) is assembled, the return spring 250 is disposed around the spring guide 408. The first stem guide body 272 also has a first collar 410 extending from the second side 404 of the first disc 400. The first collar 410 defines a bore 412. When the plug assembly 220 is assembled, the bore 412 in the first collar 410 defines the balance chamber 258. In the illustrated example, the first stem guide body 272 has a groove 414 (e.g., a channel, a recess) along the outer peripheral edge 406 of the first disc 400 between the first side 402 and second side 404. The groove 414 forms at least a portion of the second balance passage 270 (FIG. 2). The first collar 410 has a distal end 416. The first collar 410 has a first notch 418 and a second notch 420 extending into the distal end 416. The first and second notches 418, 420 form at least a portion of the second balance passage 270 (FIG. 2). In the illustrated example, the first and second notches 418, 420 are spaced 180° apart relative to a central axis of the first stem guide body 272. While in this example the first collar 410 includes two notches (multiple notches), in other examples, the first collar 410 may include more or fewer notches (e.g., one notch, three notches, four notches, etc.).

Figure 5:
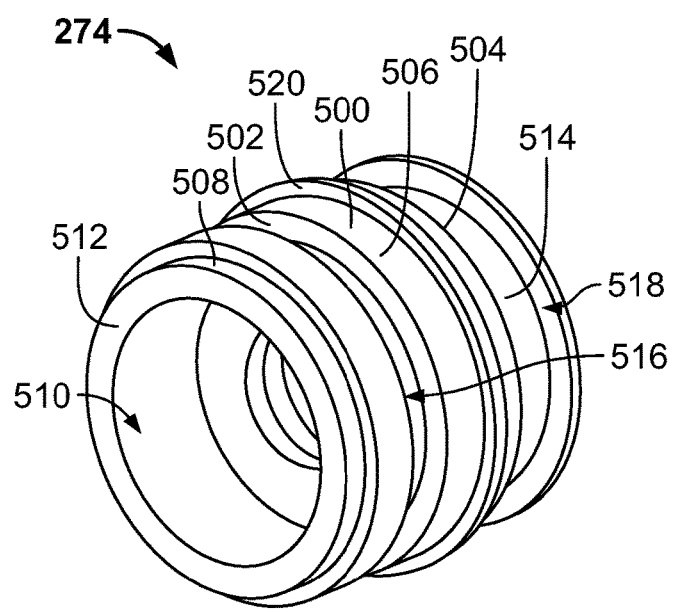
FIG. 5 is a perspective view of an example second stem guide body of the example plug assembly of FIG. 2.

FIG. 5 is a perspective view of the second stem guide body 274. The second stem guide body 274 includes a second disc 500 having a first side 502, a second side 504 opposite the first side 502, and an outer peripheral edge 506. The second stem guide body 274 has a second collar 508 extending from the first side 502 of the second disc 500. The second collar 508 defines a bore 510. The second collar 508 has a distal end 512. The second stem guide body 274 also includes a plug guide 514 extending from the second side 504 of the second disc 500. An outer surface of the second stem guide body 274 has a first seal gland 516 and a second seal gland 518. The outer surface of the second stem guide body 274 also has a flange 520.

Figure 6:
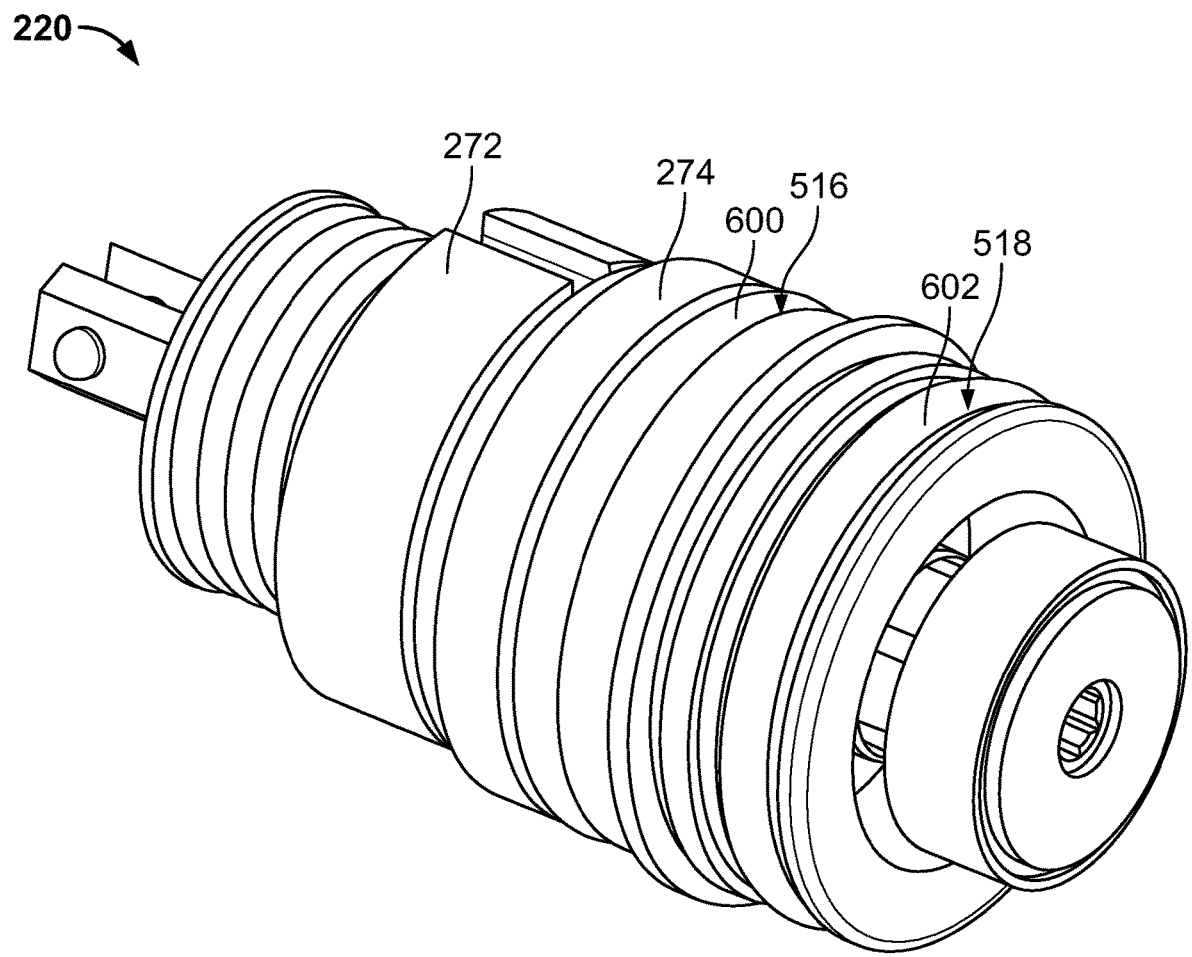
FIG. 6 is a perspective view of the example plug assembly of FIG. 2.

FIG. 6 is a perspective view of the plug assembly 220 in an assembled state. When the plug assembly 220 is assembled, a portion of the first stem guide body 272 extends into the second stem guide body 274. In the illustrated example, the plug assembly 220 includes a first seal 600 in the first seal gland 516 and a second seal 602 in the second seal gland 518.

FIG. 7 is an enlarged cross-sectional view of the plug assembly 220 in the channel 216 of the device body 202. In the illustrated example, the first stem guide body 272 is engaged with a first shoulder 700 in the channel 216. In particular, the first disc 400 of the first stem guide body 272 is engaged with the first shoulder 700. In other examples, another portion of the first stem guide body 272 can be engaged with the first shoulder 700. In the illustrated example, the second stem guide body 274 is engaged with a second shoulder 702 in the channel 216. In particular, the flange 520 of the second stem guide body 274 is engaged with the second shoulder 702. In some examples, the flange 520 is clamped between the regulator body 204 and the casing 206. The first and second shoulders 700, 702 axially position the first and stem guide bodies 272, 274 in the channel 216. In some examples, the first and second stem guide bodies 272, 274 are sized to form an interference fit (sometimes referred to as friction fit or press fit) with an inner surface 704 of the channel 216. In the illustrated example, the first and second seals 600, 602 form a seal between the second stem guide body 274 and the inner surface 704. In the illustrated example, the second disc 508 has a larger diameter than the first disc 410.

In the illustrated example, the balance chamber 258 is formed by the bore 412 inside of the first collar 410, and between an end wall 706 of the first stem guide body 272 and the second disc 500 of the second stem guide body 274. The flange 256 of the stem 228 divides the balance chamber 258 into the first balance chamber portion 260 and the second balance chamber portion 262. In the illustrated example, the plug assembly 220 includes a first seal 708 between the stem 228 and the first stem guide body 272 that fluidly isolates the first balance chamber portion 260 and the pressure sense chamber 214. The plug assembly 220 also includes a second seal 710 between the stem 228 and the second stem guide body 274 that fluidly isolates the second balance chamber portion 262 and the fluid passageway 208.

As disclosed herein, the second balance passage 270 fluidly couples the pressure sense chamber 214 and the second balance chamber portion 262. As shown in FIG. 7, the first side 402 of the first disc 400 is engaged with the first shoulder 700 in the channel 216. The groove 414 enables the fluid to pass across the first disc 400 between the first side 402 and the second side 404. As such, the groove 414 forms a portion of the second balance passage 270. In some examples, the first disc 400 can have multiple grooves. Additionally or alternatively, the first disc 400 may have one more through-holes extending through the first disc 400 between the first side 402 and the second side 404.

In the illustrated example, the first collar 410 of the first stem guide body 272 extends into the bore 510 of the second collar 508 of the second stem guide body 274. In the illustrated example, the distal end 512 of the second collar 508 is spaced from the second side 404 of the first disc 400, and the distal end 416 of the first collar 410 is engaged with the second disc 500 of the second stem guide body 274. The bore 510 of the second collar 508 has a larger diameter than the first collar 410 of the first stem guide body 272. As such, a gap 712 is formed between the first collar 410 of the first stem guide body 272 and the second collar 508 of the second stem guide body 274. The gap 712 forms at least a portion of the second balance passage 270. Therefore, fluid can flow from the pressure sense chamber 214 to the second balance chamber portion 262 by flowing through the groove 414 to the area between the first disc 400 and the distal end 512 for the second collar 508, through the gap 712 between the first and second collars 410, 508, and then through the first and second notches 418, 420 into the second balance chamber portion 262. Fluid can also flow in the reverse direction. As such, the fluid in the second balance chamber portion 262 is at the same (or substantially the same) pressure as the pressure sense chamber 214. Therefore, in this example, the groove 414, the gap 712, and the notches 418, 420 form the second balance passage 270 and, thus, form the means for fluidly coupling the pressure sense chamber 214 and the second balance chamber portion 262. In other examples, the second balance passage 270 can be formed partially or fully in other structures. For example, the second balance passage 270 could include one or more channels or passages formed in the stem 228 and/or the device body 202.

In the illustrated example, the first balance chamber portion 260 is disposed between the pressure sense chamber 214 and the second balance chamber portion 262, and the second balance chamber portion 262 is disposed between the first balance chamber portion 260 and the fluid passageway 208. As such, the stem 228 is balanced with P2 and P1 (or P3) on both sides.

In the illustrated example, the distal end 416 of the first collar 410 is engaged with the second disc 500, and the first and second notches 418, 420 enable fluid to pass therethrough. In other examples, the first collar 410 can be spaced from the second disc 500, such that fluid can pass therethrough at any radial location. In some examples, the distal end 512 of the second collar 508 can be engaged with the second side 404 of the first disc 400. In some examples, the groove 414 extends radially into the first disc 400 a sufficient distance such that the groove 414 and the gap 712 are fluidly coupled. In some examples, the plug assembly 220 is from the device body 202. In some examples, the plug assembly 220 is size and shaped to fit in existing pressure regulators. Therefore, old plug assemblies can be removed and replaced with the example plug assembly 220.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that balance or substantially balance a plug assembly of a pressure regulator so that the pressure regulator is less sensitive to the upstream pressure and more sensitive and responsive to the intended downstream location.

Examples balanced plug assemblies and example pressure regulators have been disclosed herein. Examples and example combinations include the following:

Example 1 is a pressure regulator comprising a device body defining a fluid passageway between an inlet and an outlet. The device body defines a channel between the fluid passageway and a pressure sense chamber. The pressure regulator includes a seat in the fluid passageway, a stem having a flange, and a plug coupled to the stem. The stem is moveable to move the plug relative to the seat to control a flow of fluid between the inlet and the outlet. The pressure regulator also includes a stem guide disposed in the channel of the device body. The stem guide has a first side exposed to the fluid passageway and a second side exposed to the pressure sense chamber. The stem guide defines a balance chamber. The stem extends through the stem guide. The flange of the stem is disposed in the balance chamber and divides the balance chamber into a first balance chamber portion and a second balance chamber portion. The stem guide at least partially forms a balance passage that fluidly couples the pressure sense chamber and the second balance chamber portion.

Example 2 includes the pressure regulator of Example 1, wherein the stem guide includes a first stem guide body and a second stem guide body. A portion of the balance passage is formed between the first and second stem guide bodies.

Example 3 includes the pressure regulator of Example 2, further including a first seal between the first stem guide body and the stem to fluidly isolate the first balance chamber portion and the pressure sense chamber, and a second seal between the second stem guide body and the stem to fluidly isolate the second balance chamber portion and the fluid passageway.

Example 4 includes the pressure regulator of Example 3, wherein the first stem guide body has a first disc with a first shoulder in the channel, and the second stem guide body has a second disc with a flange engaged with a second shoulder in the channel.

Example 5 includes the pressure regulator of Example 4, wherein the second disc has a larger diameter than the first disc.

Example 6 includes the pressure regulator of any of Examples 1-5, wherein the first balance chamber portion is disposed between the pressure sense chamber and the second balance chamber portion, and the second balance chamber portion is disposed between the first balance chamber portion and the fluid passageway.

Example 7 includes the pressure regulator of any of Examples 1-6, wherein the flange has a seal gland. The pressure regulator further includes a seal in the seal gland that is engaged with an inner surface of the stem guide forming the balance chamber. The seal is to fluidly isolate the first and second balance chamber portions.

Example 8 includes the pressure regulator of any of Examples 1-7, wherein the pressure regulator is an external sense pressure regulator.

Example 9 is a plug assembly for a pressure regulator. The plug assembly comprises a stem having a stem body and a flange extending radially from the stem body and a plug coupled to the stem body. The plug is to be moved relative to a seat in the pressure regulator to control a flow of fluid through the seat. The plug assembly also includes a stem guide to be disposed in the pressure regulator between a fluid passageway and a pressure sense chamber. The stem guide has a first side to face the pressure sense chamber and a second side to face the fluid passageway. The stem guide defines a balance chamber. The stem extends through the stem guide such that the flange is disposed in the balance chamber. The flange divides the balance chamber into a first balance chamber portion and a second balance chamber portion. A first balance passage is defined in the stem and the plug that fluidly couples the fluid passageway and the first balance chamber portion, and a second balance passage is defined in the stem guide that fluidly couples the pressure sense chamber and the second balance chamber portion.

Example 10 includes the plug assembly of Example 9, wherein the stem guide includes a first stem guide body and a second stem guide body.

Example 11 includes the plug assembly of claim 10, wherein the first stem guide body includes a first disc having a first side and a second side opposite the first side. The first stem guide body has a collar extending from the first side of the first disc. The first disc has a groove along an outer peripheral edge the first disc between the first side and the second side of the first disc. The groove forms at least a portion of the second balance passage.

Example 12 includes the plug assembly of Example 11, wherein the second stem guide body includes a second disc and a second collar extending from the second disc. The first collar extends into a bore defined by the second collar. The bore has a larger diameter than the first collar such that a gap is formed between the first collar and the second collar. The gap forms at least a portion of the second balance passage.

Example 13 includes the plug assembly of Example 12, wherein the second disc has a larger diameter than the first disc.

Example 14 includes the plug assembly of Examples 12 or 13, wherein the balance chamber is defined in the first collar.

Example 15 includes the plug assembly of any of Examples 12-14, wherein a distal end of the first collar is engaged with the second disc in the bore of the second collar.

Example 16 includes the plug assembly of Example 15, wherein the first collar has a notch extending into the distal end of the first collar, the notch forming at least a portion of the second balance passage.

Example 17 includes the plug assembly of Examples 15 or 16, wherein the first collar has multiple notches.

Example 18 is a pressure regulator comprising a device body defining a fluid passageway between an inlet and an outlet. The device body has a channel between the fluid passageway and a pressure sense chamber. The pressure regulator includes a seat in the fluid passageway, a stem having a flange, and a plug coupled to the stem. The stem is moveable to move the plug relative to the seat to control a flow of fluid between the inlet and the outlet. The pressure regulator also includes a stem guide disposed in the bore of the device body. The stem guide has a first side exposed to the fluid passageway and a second side exposed to the pressure sense chamber, the stem guide defining a balance chamber. The stem extends through the stem guide. The flange of the stem is disposed in the chamber and divides the chamber into a first balance chamber portion and a second balance chamber portion. The pressure regulator further includes means for fluidly coupling the fluid passageway and the first balance chamber portion, and means for fluidly coupling the pressure sense chamber and the second balance chamber portion.

Example 19 includes the pressure regulator of Example 18, wherein the first balance chamber portion is disposed between the pressure sense chamber and the second balance chamber portion, and the second balance chamber portion is disposed between the first balance chamber portion and the fluid passageway.

Example 20 includes the pressure regulator of Examples 18 or 19, wherein the stem guide includes a first stem guide body and a second stem guide body.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A pressure regulator comprising:
   a device body defining a fluid passageway between an inlet and an outlet, the device body defining a channel between the fluid passageway and a pressure sense chamber;
   a seat in the fluid passageway;
   a stem having a flange;
   a plug coupled to the stem, the stem being moveable to move the plug relative to the seat to control a flow of fluid between the inlet and the outlet;
   a stem guide disposed in the channel of the device body, the stem guide having a first side exposed to the fluid passageway and a second side exposed to the pressure sense chamber, the stem guide defining a balance chamber, the stem extending through the stem guide, the flange of the stem disposed in the balance chamber and dividing the balance chamber into a first balance chamber portion and a second balance chamber portion, the stem guide at least partially forming a balance passage that fluidly couples the pressure sense chamber and the second balance chamber portion; and
   a seal between the stem guide and the stem to fluidly isolate the second balance chamber portion and the fluid passageway.

2. The pressure regulator of claim 1, wherein the stem guide includes a first stem guide body and a second stem guide body, a portion of the balance passage formed between the first and second stem guide bodies.

3. The pressure regulator of claim 2, wherein the seal is a first seal, the pressure regulator further including:
   a second seal between the first stem guide body and the stem to fluidly isolate the first balance chamber portion and the pressure sense chamber.

4. The pressure regulator of claim 3, wherein the first stem guide body has a first disc engaged with a first shoulder in the channel, and the second stem guide body has a second disc with a flange engaged with a second shoulder in the channel.

5. The pressure regulator of claim 4, wherein the second disc has a larger diameter than the first disc.

6. The pressure regulator of claim 2, wherein the first stem guide body includes a first disc having a first side and a second side opposite the first side, the first stem guide body having a first collar extending from the first side of the first disc, the first disc having a groove along an outer peripheral edge the first disc between the first side and the second side of the first disc, the groove forming at least a portion of the balance passage.

7. The pressure regulator of claim 6, wherein the second stem guide body includes a second disc and a second collar extending from the second disc, the first collar extending into a bore defined by the second collar, the bore having a larger diameter than the first collar such that a gap is formed between the first collar and the second collar, the gap forming at least a portion of the balance passage.

8. The pressure regulator of claim 1, wherein the first balance chamber portion is disposed between the pressure sense chamber and the second balance chamber portion, and the second balance chamber portion is disposed between the first balance chamber portion and the fluid passageway.

9. The pressure regulator of claim 1, wherein the seal is a first seal, wherein the flange has a seal gland, the pressure regulator further including a second seal in the seal gland that is engaged with an inner surface of the stem guide forming the balance chamber, the second seal to fluidly isolate the first and second balance chamber portions.

10. The pressure regulator of claim 1, wherein the pressure sense chamber is fluidly coupled to a downstream location external to the pressure regulator.

11. A plug assembly for a pressure regulator, the plug assembly comprising:

a stem having a stem body and a flange extending radially from the stem body;

a plug coupled to the stem body, the plug to be moved relative to a seat in the pressure regulator to control a flow of fluid through the seat; and a stem guide to be disposed in the pressure regulator between a fluid passageway and a pressure sense chamber, the stem guide having a first side to face the pressure sense chamber and a second side to face the fluid passageway, the stem guide defining a balance chamber, the stem extending through the stem guide such that the flange is disposed in the balance chamber, the flange dividing the balance chamber into a first balance chamber portion and a second balance chamber portion, wherein a first balance passage is defined in the stem and the plug that fluidly couples the fluid passageway and the first balance chamber portion, and wherein a second balance passage is defined in the stem guide that fluidly couples the pressure sense chamber and the second balance chamber portion, the stem including a first stem guide body and a second stem guide body, the first stem guide body includes a first disc having a first side and a second side opposite the first side, the first stem guide body having a first collar extending from the first side of the first disc, the first disc having a groove along an outer peripheral edge of the first disc between the first side and the second side of the first disc, the groove forming at least a portion of the second balance passage.

12. The plug assembly of claim 11, wherein the second stem guide body includes a second disc and a second collar extending from the second disc, the first collar extending into a bore defined by the second collar, the bore having a larger diameter than the first collar such that a gap is formed between the first collar and the second collar, the gap forming at least a portion of the second balance passage.

13. The plug assembly of claim 12, wherein the second disc has a larger diameter than the first disc.

14. The plug assembly of claim 12, wherein the balance chamber is defined in the first collar.

15. The plug assembly of claim 12, wherein a distal end of the first collar is engaged with the second disc in the bore of the second collar.

16. The plug assembly of claim 15, wherein the first collar has a notch extending into the distal end of the first collar, the notch forming at least a portion of the second balance passage.

17. The plug assembly of claim 15, wherein the first collar has multiple notches.

18. A pressure regulator comprising:

a device body defining a fluid passageway between an inlet and an outlet, the device body having a channel between the fluid passageway and a pressure sense chamber;

a seat in the fluid passageway;

a stem having a flange;

a plug coupled to the stem, the stem being moveable to move the plug relative to the seat to control a flow of fluid between the inlet and the outlet;

a stem guide disposed in the channel of the device body, the stem guide having a first side exposed to the fluid passageway and a second side exposed to the pressure sense chamber, the stem guide defining a balance chamber, the stem extending through the stem guide, the flange of the stem disposed in the balance chamber and dividing the balance chamber into a first balance chamber portion and a second balance chamber portion, wherein the stem and the stem guide are sealingly engaged such that the second balance chamber portion is fluidly isolated from the fluid passageway;

means for fluidly coupling the fluid passageway and the first balance chamber portion; and means for fluidly coupling the pressure sense chamber and the second balance chamber portion.

19. The pressure regulator of claim 18, wherein the first balance chamber portion is disposed between the pressure sense chamber and the second balance chamber portion, and the second balance chamber portion is disposed between the first balance chamber portion and the fluid passageway.

20. The pressure regulator of claim 18, wherein the stem guide includes a first stem guide body and a second stem guide body.

* * * * *